United States Patent
Persch

(10) Patent No.: US 9,531,675 B2
(45) Date of Patent: Dec. 27, 2016

(54) DEVICE, SYSTEM AND METHOD FOR SUPPORTING THE SETTING UP OF A LOCAL AREA NETWORK

(71) Applicant: Christian Persch, Neu-Anspach (DE)

(72) Inventor: Christian Persch, Neu-Anspach (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 14/919,071

(22) Filed: Oct. 21, 2015

(65) Prior Publication Data
US 2016/0043997 A1 Feb. 11, 2016

Related U.S. Application Data

(63) Continuation of application No. PCT/EP2014/060233, filed on May 19, 2014.

(30) Foreign Application Priority Data

Jun. 5, 2013 (DE) .................. 10 2013 105 799

(51) Int. Cl.
*G06F 9/00* (2006.01)
*H04L 29/06* (2006.01)
(Continued)

(52) U.S. Cl.
CPC ......... *H04L 63/0272* (2013.01); *G06F 1/1632* (2013.01); *G06F 8/61* (2013.01);
(Continued)

(58) Field of Classification Search
CPC .... H04L 63/0272; H04L 63/029; H04L 63/08; G06F 13/385; G06F 13/4081; G06F 9/44; G06F 1/1632
(Continued)

(56) References Cited

U.S. PATENT DOCUMENTS 6,917,280 B1  7/2005  Griffith et al.
6,948,006 B1  9/2005  Taguchi
(Continued)

FOREIGN PATENT DOCUMENTS

CN   1617515 A   5/2005
CN   101163128 A  4/2008
(Continued)

OTHER PUBLICATIONS

Gabriel Torres, Connecting Two PCs Using a USB-USB Cable, article, Nov. 16, 2005, 2 pages, Hardware Secrets, LLC.

*Primary Examiner* — Samson Lemma
(74) *Attorney, Agent, or Firm* — Reinhart Boerner Van Dueren P.C.

(57) ABSTRACT

A device comprises a first integrated network card (105), a second integrated network card (106), a memory (103), which stores a driver for the second network card (106) and a setup program, and a USB connection (107) internally connected to the second integrated network card (106) and to the memory (103). The setup program, when executed by a processor (201) of an external device (200) connected to the device (100) via the USB connection (107), is configured to cause the external device (200) to install the driver for the second network card (106) in the external device (200). A system comprises such a device (100) and the external device (200). A method is provided for a corresponding installation of the driver.

11 Claims, 2 Drawing Sheets

(51) Int. Cl.
   *G06F 13/38*    (2006.01)
   *G06F 13/40*    (2006.01)
   *G06F 1/16*     (2006.01)
   *G06F 9/44*     (2006.01)
   *G06F 9/445*    (2006.01)

(52) U.S. Cl.
   CPC .............. *G06F 9/44* (2013.01); *G06F 13/385* (2013.01); *G06F 13/4081* (2013.01); *H04L 63/029* (2013.01); *H04L 63/08* (2013.01)

(58) Field of Classification Search
   USPC .......................................................... 726/15
   See application file for complete search history.

(56) References Cited

U.S. PATENT DOCUMENTS

| | | | |
|---|---|---|---|
| 2004/0162105 A1* | 8/2004 | Reddy | H04L 63/0853 455/551 |
| 2006/0094936 A1 | 5/2006 | Russ | |
| 2009/0262381 A1* | 10/2009 | Tsujimoto | H04N 1/00204 358/1.14 |
| 2012/0185563 A1 | 7/2012 | Sugiyama et al. | |
| 2013/0111096 A1 | 5/2013 | Chang | |
| 2014/0129681 A1* | 5/2014 | Gorilovsky | G06F 9/4413 709/219 |

FOREIGN PATENT DOCUMENTS

| | | |
|---|---|---|
| CN | 101827165 A | 9/2010 |
| CN | 201781623 U | 3/2011 |
| DE | 10 2004 049 900 A1 | 1/2006 |
| DE | 10 2010 060 758 A1 | 5/2012 |
| TW | M424723 U | 3/2012 |

\* cited by examiner

DEVICE, SYSTEM AND METHOD FOR SUPPORTING THE SETTING UP OF A LOCAL AREA NETWORK

CROSS-REFERENCE TO RELATED PATENT APPLICATIONS

This patent application is a continuation of PCT/EP2014/060233, filed May 19, 2014, which claims priority to German Application No. 10 2013 105 799.3, filed Jun. 5, 2013, the entire teachings and disclosure of which are incorporated herein by reference thereto.

FIELD OF THE INVENTION

The invention relates, amongst other things, to a device, a system and a method which support the setting up of a local area network.

BACKGROUND OF THE INVENTION

In some environments, information technology (IT) employed is serviced by different parties. This information technology can comprise computers, software, peripheral devices and an internet connection, for example.

Thus, for example in a retail establishment with existing information technology, additionally services of another company can be offered, for instance by additionally operating a postal agency or a lottery outlet. For such services, usually the proprietary software of the other company is at least required.

Installing the software of the other company on a computer provided for the retail business is often out of the question, since in some cases it can be accompanied by a security risk.

Instead, one of the computers provided for the retail business could be connected via the Internet to a web service provided by a secure, central server of the other company. However, on the one hand, this usually requires the computer to be configured in a complex way. The knowledge required for this is maybe not available in-house and sending specialist personnel to do the configuration is cost-intensive. On the other hand, using a web service does not allow any offline operation. In other words, the services cannot be provided if the server goes down or access to the internet fails.

Therefore, in order to guarantee uninterrupted operation, conventionally two complete computer systems along with peripherals are operated. However, this is also accompanied by high costs and takes up additional space.

SUMMARY OF THE INVENTION

One of the objects of the invention consists in providing a device, a system and a method, by means of which the above mentioned disadvantages can be avoided.

The object is achieved by a device according to claim 1, a system according to claim 9 and a method according to claim 10. Further embodiments are to be derived from the dependent claims.

An exemplary embodiment of a device according to the invention comprises a first integrated network card, a second integrated network card, a memory, which stores a driver for the second network card and a setup program, and a USB (Universal Serial Bus) connection internally connected to the second integrated network card and to the memory. The setup program, when executed by a processor of an external device connected to the device via the USB connection, is configured to cause the external device to install the driver for the second network card in the external device.

An exemplary embodiment of a system according to the invention comprises such a device and the external device.

An exemplary embodiment of a method according to the invention comprises in a system, which has a first device and a second device which is external to the first device, wherein the first device comprises a first integrated network card, a second integrated network card, a memory, which stores a driver and a setup program, and a USB connection internally connected to the second integrated network card and to the memory:

automatic recognition of the memory by the second device when the second device is connected to the first device via the USB connection; and installation of the driver for the second network card in the second device caused by the setup program when the setup program is executed by a processor of the second device.

The invention is based on the consideration that peripheral devices or an Internet connection could be jointly used by a plurality of devices if the devices were connected together by means of a local area network. However, connecting devices conventionally by means of a local area network, at least when dispensing with a user interface for one of the devices, can only be achieved with considerable effort or cannot be achieved at all, if both devices are provided by different IT operators.

Therefore, for certain exemplary embodiments the invention makes provision for a first device with a network card to provide another network card for a second device via a USB connection. The driver for this network card can be provided in a memory of the first device which the second device can access via the USB connection for a local installation by means of a setup program which is also provided.

The effect of this may be that functions of a first device can be easily used by means of an external device via a local area network. The external device does not require its own network card for such a local area network. Instead, the required network card is integrated into the first device. No separate preparation of the external device by the user, such as installing a driver from a CD, is required either. An advantage can arise from this particularly for environments which are serviced by at least two different IT operators.

The USB connection for the device can be designed in different ways. For example, it can comprise a USB receptacle which enables a connection to be made to a USB receptacle of the external device via a USB cable. Alternatively, the USB connection can, for example, comprise a permanently connected USB cable which enables a connection to be made to a USB receptacle of the external device. Within the device, the connection to the second integrated network card and the memory can be made, for example, via a USB hub or a circuit which is similar to a USB hub.

The memory of the device can be any non-volatile memory whose stored content can be read by a processor, for example but not exclusively a hard disk drive, a flash memory or a solid state drive (SSD). The memory can allow read and write access or read-only access.

The driver can be integrated into the setup program or stored separately.

In an exemplary embodiment, the memory also stores configuration data. The setup program could then further be configured to, when invoked by the processor of the external device, cause the external device to set up a local area network between the device and the external device using the configuration data such that the first network card functions as a network card for the device and the second network card functions as a network card for the external device. This can, for example, include the allocation of an internet protocol (IP) address to the second network card. The effect of such an embodiment may be that, apart from possible confirmation queries, the network can be set up completely automatically and therefore without any prior knowledge from the user. Since both network cards are provided from one source, namely as components of a single device, all required data can be specified beforehand.

Additionally or alternatively, the setup program could also be configured to, when invoked by the processor of the external device, cause the external device to store presettings for a reconnection and/or for a restart of the external device in the external device based on the configuration data. The effect of this may be that drivers and configuration data are only installed or stored once and/or that certain programs are automatically invoked in the case of a subsequent connection or in the case of a restart.

In an exemplary embodiment, the memory is configured such that it is only partly enabled for direct access by an external device via the USB connection. Additionally or alternatively, the device could comprise a second memory which is not directly accessible via the USB connection. The effect of both variants may be that certain stored data can only be accessed after a particular, where necessary secure, connection has been established.

In an exemplary embodiment, the memory also stores a start program. The start program can be configured to, when invoked by the processor of the external device, cause the external device to set up remote access to the device. Such remote access is also called terminal service and can, for example, be a Terminal Service or Remote Desktop Service from Microsoft Windows. Of course, the start program can be a separate program, but, for example, also a part of the setup program. It should also be understood that provision can be made for the start program to be executed automatically based on the presettings of the setup program or for it to be invoked separately by a user.

The remote access can, for example, enable at least one application program to be used which is to be executed by the device and which is stored in the memory or in another memory of the device. The effect of this may be that an application program can be used directly on the provided device without it having to be firstly installed on another device.

Alternatively or additionally, the remote access can enable the use of peripheral devices, which are connected to the external device, by functions of at least one application program which is stored in the memory or in another memory of the device. Such peripheral devices can comprise a keyboard, a mouse, a monitor, a printer and various other devices. The effect of this may be that the device does not require its own peripheral devices but can access the peripheral devices of the external device.

In exemplary embodiments, it is possible to partly use peripheral devices of the external device and partly use the device's own peripheral devices. In this way, keyboard, monitor, voucher printer and scanner of the external device could be used, and pass book printer and PIN pads could be directly connectable to the device.

Alternatively or additionally, the remote access can enable the setting up and use of a virtual private network (VPN) tunnel between the device and a server via the external device using a VPN program stored in the memory or in another memory of the device. The effect of this may be that a secure connection can be established between the device and the server. The establishment of the VPN tunnel can take place automatically or at the request of a user. The establishment of the VPN tunnel could, for example, occur automatically at regular intervals, in order to update the application program or data used by the application program.

In an exemplary embodiment, the device is configured to carry out an authentication of a user of the external device for starting the remote access. The effect of this may be that unauthorized access to data of the device can be prevented.

In an exemplary embodiment, the USB connection, apart from an optional connection for supplying power to the device, is the only external connection of the device. The effect of this may be that the device can be simply designed and small in size. However, as mentioned above, additional connections for particular peripheral devices or other connections can also be provided at the device.

In an exemplary embodiment, the network cards are Ethernet cards. The effect of this may be that easy access to the Internet is made possible via the external device. In an exemplary embodiment, the memory is an SSD. The effect of this may be that the device is less susceptible to problems and is robust. In an exemplary embodiment, the device comprises an operating system.

In an exemplary embodiment, the device is any computer, such as a personal computer (PC), a mini PC or a small form factor (SFF) computer. The effect of this is that an existing device can be adapted with little effort. This may further have the effect that the functionalities of a computer are also available.

Each mentioned program contains machine-readable program instructions which can be executed by a processor. Of course, each mentioned program does not have to be an individual program but may also be a software comprising a plurality of individual programs.

Further advantageous exemplary embodiments of the invention are to be derived from the following detailed description of some exemplary embodiments of the present invention, in particular in conjunction with the figures. However, the figures are only to serve for the purposes of illustration and not for determining the scope of protection of the invention. The figures are not to scale and are only to reflect, by way of example, the general concept of the present invention. In particular, features which are present in the figures are not in any way to be considered as mandatory constituents of the present invention.

DETAILED DESCRIPTION OF EXEMPLARY EMBODIMENTS OF THE INVENTION

The present invention is described below by means of exemplary embodiments which support the setting up of a local area network and the use of peripheral devices of a PC for another PC via the local area network.

Figure 1:
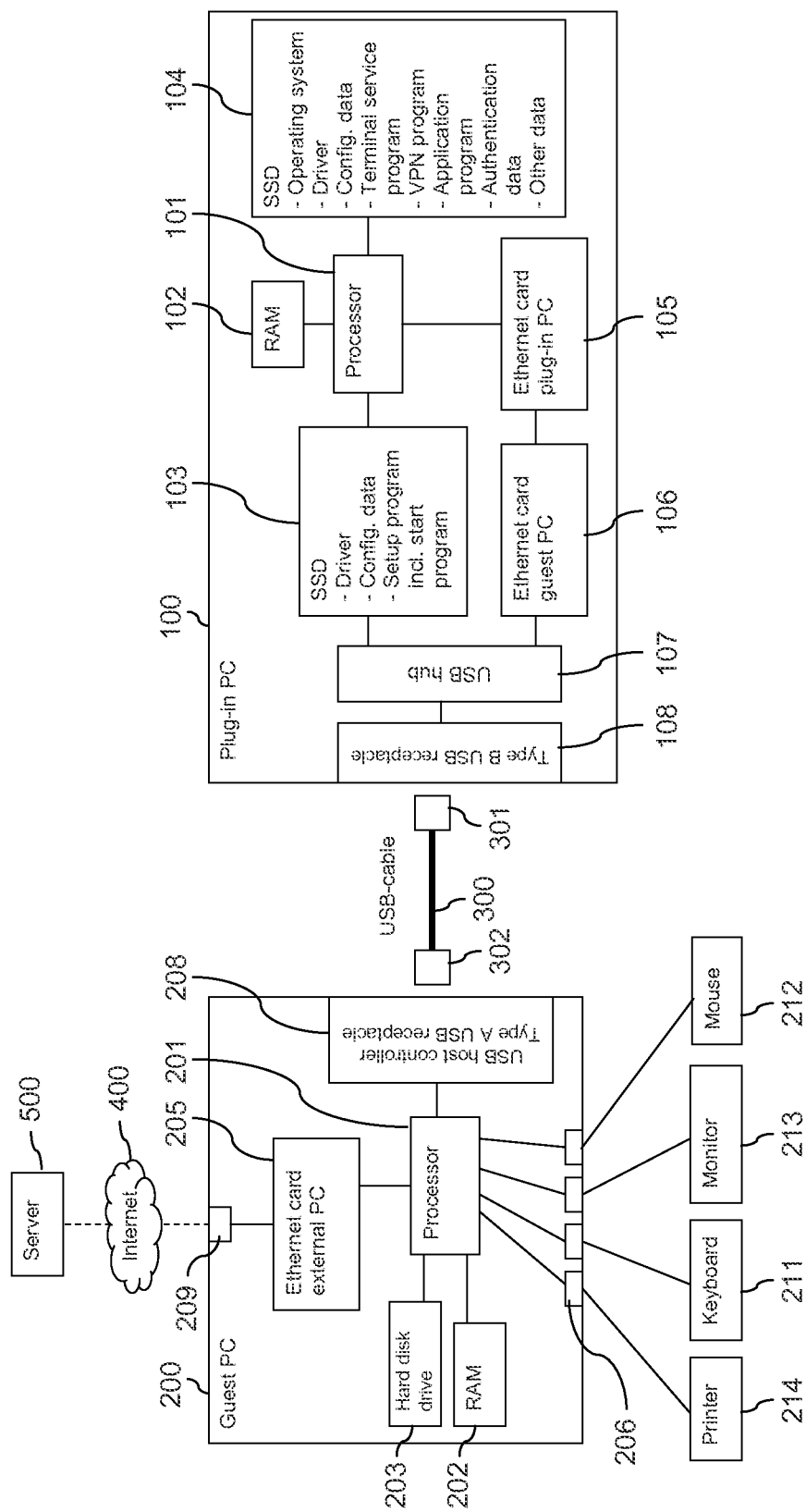
FIG. 1 shows a block diagram of an exemplary embodiment of a system according to the invention.

FIG. 1 is a schematic illustration of an exemplary embodiment of a system according to the invention.

The system is, by way of example, provided for a postal agency which is operated in a stationery shop, a bookshop, a kiosk or another retail establishment for a certain postal company.

The system comprises a plug-in PC 100, a guest PC 200 with various peripheral devices 211-214, a USB cable 300 and a server 500. The plug-in PC 100, the USB cable 300 and the server 500 are, by way of example, provided by the postal company. The guest PC 200 and the peripheral devices 211-214 belong, for example, to the operator of the retail establishment and are used for operating the establishment.

The plug-in PC 100 is an exemplary embodiment of a device according to the invention. The plug-in PC 100 is, for example, based on a conventional PC or a conventional mini PC. It comprises at least one processor 101 and, connected to the processor 101, a main memory (random access memory RAM) 102, a first non-volatile memory 103, a second non-volatile memory 104 and a network card 105. The plug-in PC 100 also comprises a second network card 106 and a circuit with a USB hub 107 or a circuit which is similar to a USB hub and an externally accessible type B USB receptacle 108.

The processor 101 is designed to execute computer programs and thereby cause the plug-in PC 100 to perform desired actions. The processor 101 can be a microprocessor, for example. The processor 101 can also be a central processing unit (CPU), for example.

The memories 103, 104 can be SSDs, but can also be any other memories, such as hard disk drives.

The memory 103 stores a driver for the network card 106, configuration data and a setup program. The memory 103 could also store further programs and data.

The memory 104 stores an operating system for the device 100, a driver for the network card 105, configuration data, a remote access program, a VPN program, an application program, authentication data and other data, such as data to be used by the application data. The operating system can be a windows operating system, for example, and the remote access program can be terminal service software provided by the operating system, for example. In the present example, the application program can be a postal application which, for instance, can comprise a point of sale application for the sale of postal goods. The memory 104 could also store further programs and data.

The memories 103, 104 and the programs stored therein are configured to, with a processor, cause a device to perform desired actions, when a respective program is read and executed by a respective processor.

The network cards 105, 106 can be Ethernet network cards, for example. The network cards 105, 106 are connected to one another. A network cable can be used for this purpose, for example. However, for reasons of space, the connection can also be effected directly on a chip, for example, on which chip both network cards 105, 106 are integrated.

Alternatively, the type B USB receptacle 108 could also be integrated into a USB hub 107. Instead of the USB receptacle 108, the plug-in PC 100 could also have a permanently connected USB cable which comprises a type A USB plug at its end.

Of course, the plug-in PC 100 can comprise various other components which are not illustrated, such as a power supply connection or a connection for certain peripheral devices.

In the exemplary embodiments, the plug-in PC 100 exclusively comprises a power supply connection in addition to the USB receptacle 108 as an external connection. In some embodiments, the power could also be supplied via a USB connection, so that the USB connection could be the only external connection. With both embodiments, dimensions of less than 10 cm×10 cm×5 cm can be achieved for the plug-in PC 100.

The guest PC 200 is an exemplary external device. The guest PC 200 can be a conventional PC used in the retail establishment, for example. The guest PC 200 comprises at least one processor 201 and, connected to the processor 201, a main memory (random access memory RAM) 202, a hard disk drive 203, an Ethernet network card 205, connections 206 for various peripheral devices and a circuit 208 with a USB host controller and an externally accessible type A USB receptacle. The guest PC 200 also has an Ethernet connection 209 which is connected to the network card 205.

The processor 201 is configured to execute computer programs and thereby cause the guest PC 200 to perform desired actions. The processor 201 can be a CPU in the form of a microprocessor.

The hard disk drive 203 stores the operating system for the guest PC 200 and other programs and data. The operating system can again be a Windows operating system, for example, which comprises a terminal service program. Instead of the hard disk drive 203, another data storage device could also be used.

The Ethernet network card 205 enables a connection to the Internet 400 via the Ethernet connection 209. Another network card could also be provided instead of the Ethernet network card 205.

The peripheral devices can comprise a keyboard 211, a mouse 212, a monitor 213 and a printer 214, for example. Of course, a variety of other peripheral devices, such as a PIN pad for inputting a pin code or a scanner, are also possible.

The USB cable 300 comprises a type B USB plug 301 at one end and a type A USB plug 302 at the other end. In this way, the cable 300 can be connected to the USB receptacle 108 via the USB plug 301 and it can be connected to the USB receptacle of the circuit 208 via the USB plug 302, so that the guest PC 200 is connected to the plug-in PC 100.

Of course, other connections can also be provided for the USB connections, such as mini or micro USB connections.

For example, updates for the application program stored in the plug-in PC 100 and updated data for the application program can be provided in the server 500. The server 500 can be accessed via the Internet 400.

The system from FIG. 1 can be modified in various ways, both by omitting components and by adding components. Further or alternative advantages can result because of this.

Figure 2:
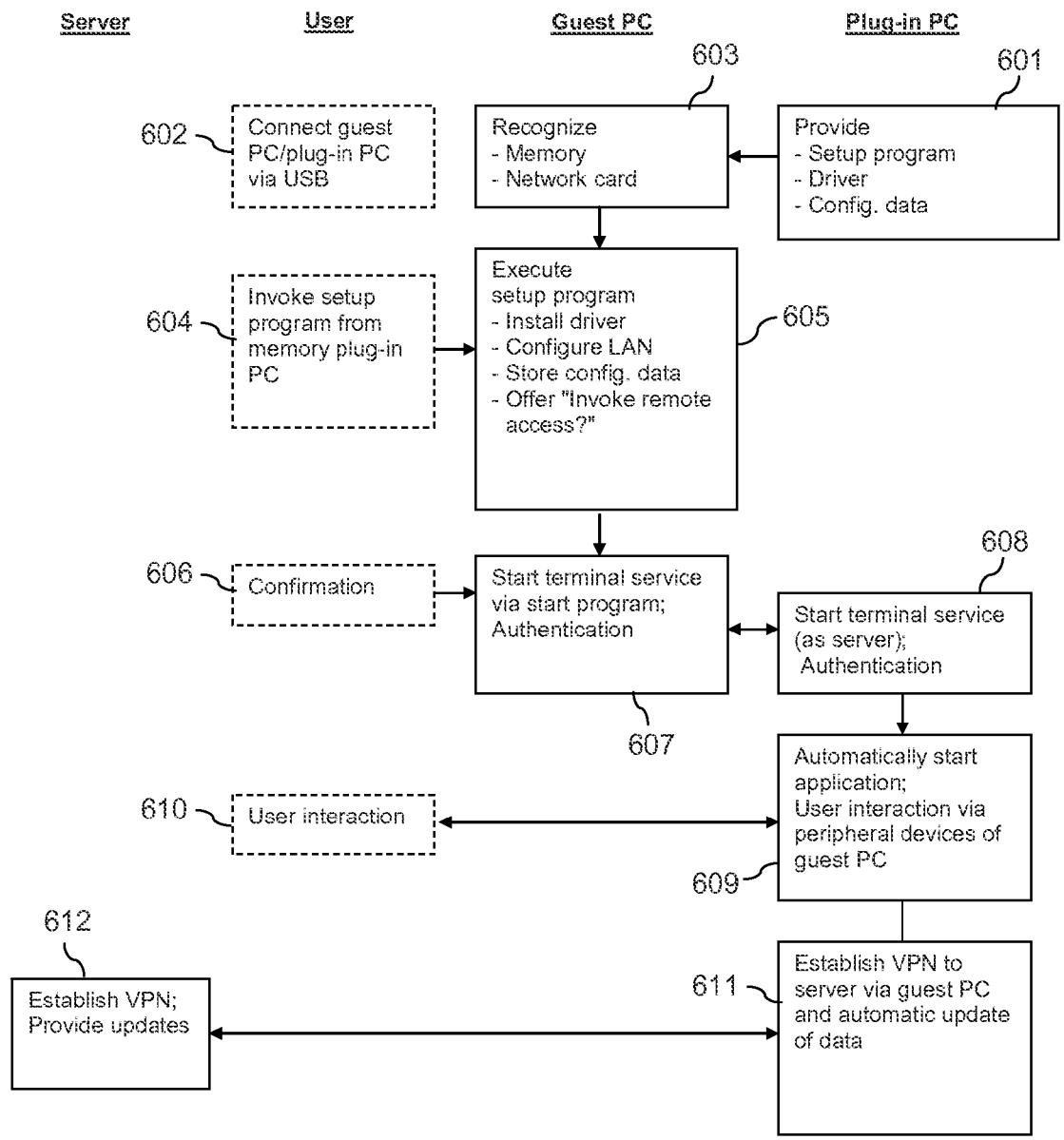
FIG. 2 shows a flowchart with method steps of an exemplary embodiment of the method according to the invention.

FIG. 2 is a flowchart which illustrates an operation in the system of FIG. 1 according to an exemplary embodiment of a method according to the invention. The figure shows, from left to right, operations of the server 500, user actions, operations of the guest PC 200 and operations of the plug-in PC 100.

The guest PC 200 is configured in such a way that it has the "right" to recognize connected USB devices. The guest PC 200 is also configured in such a way that it is allowed to establish Internet connections.

As mentioned above, the plug-in PC 100 provides a setup program, a driver and configuration data in the memory 103 (Action 601).

If a user connects the guest PC 200 to the plug-in PC 100 via the USB cable 300 (Action 602), the guest PC 200 automatically recognizes the memory 103 and the network card 106 via the USB connection (Action 603).

For the user, the content of the memory 103, at any rate at least the setup program, is subsequently visible on the monitor 213. If the user invokes the setup program by means of the keyboard 211 and/or the mouse 212 (Action 604), then the setup program is executed in the guest PC 200 by the processor 201 (Action 605).

By executing the setup program, the driver is downloaded from the memory 103 onto the guest PC 200 and installed in the guest PC 200. The required programs and data are stored on the hard disk drive 203. In addition, a local area network is set up between the guest PC 200 and the plug-in PC 100 using configuration data such that the network card 105 functions as a network card for the plug-in PC 100 and the network card 106 functions as a network card for the guest PC 200. The configuration data are retrieved from the memory 103 by the processor 201 and where required stored on the hard disk drive 203. The configuration data provided for setting up the local area network can, for example, comprise the IP address and the subnet mask for the network card 106. Further configuration data can also be retrieved from the memory 103 by the processor 201 and where required stored on the hard disk drive 203. Such further configuration data can, for example, specify what action is to be taken when the guest PC 200 is subsequently reconnected to the plug-in PC 100 or when the guest PC 200 is restarted with a continuing existing connection. For example, it can be ensured in this way that the driver is not reloaded each time and that certain programs are automatically invoked etc. In addition, the user is asked via the monitor 211 by means of a request "Start remote access?" whether remote access is to be started.

If the user positively confirms the request by means of the keyboard 212 and/or by means of the mouse 213 (Action 606), then the processor 201 invokes a start program. In the case of the present exemplary embodiment, the start program is a part of the setup program. However, it should be understood that the start program could also be stored as a separate program and that the setup program only causes the processor 201 to retrieve the start program from the memory 103 and execute it in response confirmation by the user. When the start program is executed by the processor 201, the processor 101 is prompted via the established local area network to start the terminal service (Action 607, 608). The start program can, for example, use the terminal service software for this purpose, which is in any case provided by the Windows operating system of the plug-in PC 100. The parameters required for the setting up procedure are provided by the start program or, prompted by the start program, read as further configuration parameters from the memory 103 by the processor 201. The configuration parameters can, for example, specify that the printer 214 is to be enabled for use by the plug-in PC 100, that copying data from the guest PC 200 to the plug-in PC 100 is not allowed etc. After setting up the terminal service, the plug-in PC 100 then functions as a server and the guest PC 200 functions as a client for the remote access.

Alternatively, remote access, prompted by the start program, could be started automatically by the processor 201 without any user request, in order to minimize the user effort.

As part of the setting up procedure of the remote access, in some exemplary embodiments an authentication of the user can take place. The authentication data required for this purpose can be stored in the memory 104, for example. The authentication can be effected in any way. For example, the user could be requested to input a password which he was provided with beforehand by the postal company together with the plug-in PC 100.

When the remote access has been set up, the user can use a provided application of the plug-in PC 100 via the peripheral devices 211-213 of the guest PC 200 (Actions 609, 610). The functions of the application can also use further peripheral devices of the guest PC 200, such as the printer 214. The application can be started automatically or invoked by the user. The application runs in the plug-in PC 100 itself, that is to say, a corresponding application program stored in the memory 104 is executed by the processor 101.

In addition to the application program, the memory 104 stores at least a VPN program in exemplary embodiments. This VPN program can, after the remote access has been set up, also be invoked by a user for execution by the processor 101 or it can be invoked automatically.

When the VPN program is invoked and executed by the processor 101, a VPN tunnel is established. The first end point of the VPN tunnel is the plug-in PC 100 and the second end point of the VPN tunnel is the server 500. The tunnel runs from the processor 101 via the network card 105, the network card 106, the USB connection 107, 108, 301, 300, 302, 208, the processor 201, the network card 205, the connection 209 and the interne 400 to the server 500 (Action 611, 612). The VPN client of the plug-in PC 100 is set up in such a way that it uses the IP address of the network card 106 as the standard gateway.

When the VPN tunnel is established, for example an update of the plug-in PC 100 can take place. For example, the data required for the application could be downloaded once daily from the server 500 onto the plug-in PC 100, and once weekly a check could be made as to whether there is an update for the application program etc.

Of course, the described method can be modified in many respects.

Thus, in some exemplary embodiments, the device according to the invention is a PC which can be connected to the USB port of a guest PC. The plug-in PC can also use the resources of the guest PC, such as a network connection and peripheral devices. It can provide a secure environment for applications by means of remote access and enable a secure exchange of data with a server by means of a VPN. The plug-in PC does not need its own peripheral devices, so that costs can be saved.

The illustrated or described connections between components are to be understood as functional connections. They can be implemented directly or indirectly via a plurality of other components. Each of the processors can comprise one or more control units and each of the memories can comprise one or more memory units. The sequence of the depicted actions in the flowchart is not mandatory: alternative sequences of the method steps are conceivable. The actions can be implemented in a different way.

Of course, the described embodiments are only examples which within the scope of the claims can be modified and/or supplemented in various ways. In particular, each feature which has been described for a certain exemplary embodiment can be used independently or in combination with other features in any other exemplary embodiment. Each feature which has been described for an exemplary embodiment of a certain category can also be used in a corresponding way in an exemplary embodiment of another category.

The invention claimed is:

1. A device comprising:
a first integrated network card,
a second integrated network card,
a memory, which stores a driver for the second integrated network card and a setup program, and
a USB connection internally connected to the second integrated network card and to the memory, wherein the setup program, when executed by a processor of an external device connected to the device via the USB connection, is configured to cause the external device to install the driver for the second integrated network card in the external device.

2. The device according to claim 1, wherein the memory further stores configuration data, and wherein the setup program is further configured to, when invoked by the processor of the external device, cause the external device to at least one of:
set up a local area network between the device and the external device using the configuration data such that the first integrated network card functions as a network card for the device and the second integrated network card functions as a network card for the external device; and
store presettings for a reconnection and/or for a restart of the external device in the external device based on the configuration data.

3. The device according to claim 1, wherein at least one of:
the memory is configured such that it is only partly enabled for direct access by an external device via the USB connection; and
the device comprises a second memory.

4. The device according to claim 1,
wherein the memory also stores a start program, and
wherein the start program is configured to, when it is invoked by the processor of the external device, cause the external device to set up remote access to the device, the remote access at least one of:
enabling a use of an application program, which is to be executed by the device and which is stored in the memory or in another memory of the device, and
enabling a use of peripheral devices, which are connected to the external device, by functions of an application program which is stored in the memory or in another memory of the device.

5. The device according to claim 1,
wherein the memory further stores a start program, and
wherein the start program is configured to, when invoked by the processor of the second device, cause the external device to set up remote access to the device, this remote access enabling the setting up and use of a VPN tunnel between the device and a server via the first integrated network card, the second integrated network card and the external device using a VPN program stored in the memory or in another memory of the device, wherein the first integrated network card functions as a network card for the device and the second integrated network card functions as a network card for the external device.

6. The device according to claim 4, wherein the device is configured to carry out an authentication of a user of the external device for setting up the remote access.

7. The device according to claim 1, wherein the USB connection, apart from an optional connection for supplying power to the device, is the only external connection of the device.

8. The device according to claim 1, wherein at least one of
the first and second integrated network cards are Ethernet cards,
the memory is a solid-state drive and
the device comprises an operating system.

9. The device according to claim 1, wherein the device is one of
a computer,
a personal computer (PC),
a mini PC and
a small form factor computer.

10. A system comprising a device and an external device, the device comprising:
a first integrated network card,
a second integrated network card,
a memory, which stores a driver for the second integrated network card and a setup program, and
a USB connection internally connected to the second integrated network card and to the memory, wherein the setup program, when executed by a processor of the external device connected to the device via the USB connection, is configured to cause the external device to install the driver for the second integrated network card in the external device.

11. A method in a system which has a first device and a second device which is external to the first device, wherein the first device comprises a first integrated network card, a second integrated network card, a memory, which stores a driver and a setup program, and a USB connection internally connected to the second integrated network card and to the memory, the method comprising:
automatic recognition of the memory by the second device when the second device is connected to the first device via the USB connection; and
installation of the driver for the second integrated network card in the second device, caused by the setup program, when the setup program is executed by a processor of the second device.

* * * * *